(12) United States Patent
Tsuji

(10) Patent No.: US 10,703,380 B2
(45) Date of Patent: Jul. 7, 2020

(54) AUTOMATIC DRIVING ASSISTANCE DEVICE, AND AUTOMATIC DRIVING ASSISTANCE METHOD

(71) Applicant: Panasonic Intellectual Property Management Co., Ltd., Osaka (JP)

(72) Inventor: Masanaga Tsuji, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 352 days.

(21) Appl. No.: 15/743,206

(22) PCT Filed: Jul. 21, 2016

(86) PCT No.: PCT/JP2016/003404
§ 371 (c)(1),
(2) Date: Jan. 9, 2018

(87) PCT Pub. No.: WO2017/022201
PCT Pub. Date: Feb. 9, 2017

(65) Prior Publication Data
US 2018/0201275 A1 Jul. 19, 2018

(30) Foreign Application Priority Data
Jul. 31, 2015 (JP) .................. 2015-152484

(51) Int. Cl.
*G05D 3/00* (2006.01)
*B60W 50/00* (2006.01)
(Continued)

(52) U.S. Cl.
CPC ........ *B60W 50/0098* (2013.01); *B60W 30/18* (2013.01); *B60W 40/04* (2013.01);
(Continued)

(58) Field of Classification Search
CPC ............... G05D 1/0061; G05D 1/0287; G05D 2201/0213; G08G 1/0965; B60W 50/082;
(Continued)

(56) References Cited

U.S. PATENT DOCUMENTS 5,774,069 A 6/1998 Tanaka et al.
9,836,051 B2* 12/2017 Ishikawa ................ G05D 1/021
(Continued)

FOREIGN PATENT DOCUMENTS

DE 102013210395 A1 12/2014
DE 102013012777 A1 2/2015
(Continued)

OTHER PUBLICATIONS

International Search Report, dated Oct. 18, 2016, for corresponding International Application No. PCT/JP2016/003404, 2 pages.
(Continued)

*Primary Examiner* — Dalena Tran
(74) *Attorney, Agent, or Firm* — Seed IP Law Group LLP

(57) ABSTRACT

This automatic driving assistance device automatically performs least a part of vehicle control including steering, braking, and acceleration and deceleration within a predetermined travel section. The automatic driving assistance device includes: a switching section determination unit that determines, in the travel section, a section in which a first load that is based on a road shape or a road structure becomes equal to or less than a predetermined threshold as a switching section in which the at least a part of the vehicle control is switched from automatic driving to manual driving; a driving action planning unit that, when the vehicle enters the determined switching section, generates an automatic driving action plan so that a second load that is based on a travel situation of nearby vehicles around the vehicle is reduced; and a driving switching unit that ends automatic
(Continued)

driving that is based on the automatic driving action plan and switches the automatic driving to the manual driving.

12 Claims, 6 Drawing Sheets

(51) Int. Cl.
| | |
|---|---|
| *G05D 1/00* | (2006.01) |
| *B60W 30/18* | (2012.01) |
| *G08G 1/0967* | (2006.01) |
| *B62D 6/00* | (2006.01) |
| *B62D 1/28* | (2006.01) |
| *B62D 15/02* | (2006.01) |
| *G08G 1/0962* | (2006.01) |
| *B60W 40/04* | (2006.01) |
| *B60W 40/06* | (2012.01) |
| *B60W 50/08* | (2020.01) |

(52) U.S. Cl.
CPC .......... *B60W 40/06* (2013.01); *B60W 50/082* (2013.01); *B62D 1/286* (2013.01); *B62D 6/007* (2013.01); *B62D 15/025* (2013.01); *G05D 1/0061* (2013.01); *G08G 1/09626* (2013.01); *G08G 1/096725* (2013.01); *G08G 1/096775* (2013.01); *B60W 2050/0072* (2013.01); *B60W 2050/0096* (2013.01); *G05D 2201/0213* (2013.01)

(58) Field of Classification Search
CPC ........... B60W 50/0098; B60W 50/085; B60W 50/045; B60W 50/14; B60W 2050/046; B60W 2050/0096; B60W 40/04; B60W 40/06
USPC ................. 701/23, 36, 65, 58, 48, 300–302; 340/435, 436, 901, 903, 988
See application file for complete search history.

(56) References Cited

U.S. PATENT DOCUMENTS

| | | | |
|---|---|---|---|
| 2006/0235615 A1* | 10/2006 | Kato | ..................... B60W 40/04 701/300 |
| 2015/0158482 A1* | 6/2015 | Kaminade | .............. G01V 1/001 701/1 |
| 2016/0026180 A1 | 1/2016 | Tsimhoni et al. | |
| 2016/0280234 A1 | 9/2016 | Reilhac | |

FOREIGN PATENT DOCUMENTS

| | | |
|---|---|---|
| DE | 102015112120 | 1/2016 |
| JP | 3239727 B2 | 12/2001 |
| JP | 4696720 B2 | 6/2011 |

OTHER PUBLICATIONS

English Translation of German Office Action dated Jan. 30, 2020 for the related German Patent Application No. 112016003493.8.

\* cited by examiner

FIG. 6

| Number of lanes | Left lane | Center lane | Right lane |
|---|---|---|---|
| One lane | 3 | — | — |
| Two lane | 2 | — | 5 |
| Three lanes or more | 1 | 2 | 10 |

AUTOMATIC DRIVING ASSISTANCE DEVICE, AND AUTOMATIC DRIVING ASSISTANCE METHOD

This application is a U.S. national stage application of the PCT International Application No. PCT/JP2016/003404 filed on Jul. 21, 2016, which claims the benefit of foreign priority of Japanese patent application No. 2015-152484 filed on Jul. 31, 2015, the contents all of which are incorporated herein by reference.

TECHNICAL FIELD

The present invention relates to an automatic driving assistance device, an automatic driving assistance method, and an automatic driving assistance program.

BACKGROUND ART

Conventionally, there has been a technique for automatically driving a vehicle by controlling a steering wheel, an accelerator, a brake a shift gears, direction indicators, and the like in a vehicle. A large burden may be imposed on a driver when automatic driving is switched to manual driving. Therefore, techniques for switching the automatic driving to the manual driving are disclosed in, for example, PTL 1 and PTL 2.

PTL 1 discloses an automatic driving assistance device, which determines timing to switch the automatic driving to the manual driving in consideration of a transition time required until the automatic driving is switched to the manual while the vehicle is traveling by the automatic driving, and notifies a driver of the switching to the manual driving based on the determined timing.

Moreover, PTL 2 discloses an automatic driving assistance device, which switches full automatic driving to semi-automatic driving at timing corresponding to t degree of difficulty in traveling in a section where positioning of global positioning system (GPS) is disabled, the semi-automatic driving focusing on cooperativeness between the automatic driving and the manual driving.

CITATION LIST

Patent Literatures

PTL 1: Japanese Patent No. 3,239,727
PTL 2: Japanese Patent No. 4,696,720

SUMMARY OF THE INVENTION

It is an object of the present invention to provide an automatic driving assistance device, an automatic driving assistance method, and a driving assistance program, which reduce the burden imposed on the driver when the automatic driving is switched to the manual driving.

An automatic driving assistance device according to an aspect of the present invention is an automatic driving assistance device in an automatic driving vehicle that automatically performs at least a part of vehicle control including steering, braking, and acceleration and deceleration within a predetermined travel section, and the automatic driving assistance device includes a switching section determination unit and a driving switching unit. The switching section determination unit determines, in the travel section, a section in which a first load that is based on a road shape or a road structure becomes equal to or less than a predetermined threshold as a switching section in which the at least a part of the vehicle control is twitched from automatic driving to manual driving; When the automatic driving vehicle enters the determined switching section, the driving switching unit generates an automatic driving action plan so that a second load that is based on a travel situation of nearby vehicles around the automatic driving vehicle is reduced. The driving switching unit ends automatic driving that is based on the automatic driving action plan and switches the automatic driving to the manual driving.

An automatic driving assistance method according to an aspect of the present invention is an automatic driving assistance method in an automatic driving vehicle that automatically performs at least a part of vehicle control including steering, braking, and acceleration and deceleration within a predetermined travel section, and the automatic driving assistance method includes: a switching section determination step; a driving action planning step; and a driving switching step. The switching section determination step determines, in the travel section, a section in which a first load that is based on a road shape or a road structure becomes equal to or less than a predetermined threshold as a switching section in which the at least a part of the vehicle control is switched from automatic driving to manual driving. When the automatic driving vehicle enters the determined switching section, the driving action planning step generates an automatic driving action plan so that a second load that is based on a travel situation of nearby vehicles around the automatic driving vehicle is reduced. The driving switching step ends automatic driving that is based on the automatic driving action plan and switches the automatic driving to the manual driving.

An automatic driving assistance program according to an aspect of the present invention is an automatic driving assistance program in an automatic driving vehicle that automatically performs at least a part of vehicle control including steering, braking, and acceleration and deceleration within a predetermined travel section, and the program causes a computer to function as: switching section determining means; driving action planning means; and driving switching means. The switching section determining means determines, in the travel section, a section in which a first load that is based on a road shape or a road structure becomes equal to or less than a predetermined threshold as a switching section in which the at least a part of the vehicle control is switched from automatic driving to manual driving. When the automatic driving vehicle enters the determined switching section, the driving action planning means generates an automatic driving action plan so that a second load that is based on a travel situation of nearby vehicles around the automatic driving vehicle is reduced. The driving switching means ends automatic driving that is based on the automatic driving action plan and switches the automatic driving to the manual driving.

In accordance with the present invention, the burden imposed on the driver can be reduced when the automatic driving is switched to the manual driving.

BRIEF DESCRIPTION OF DRAWINGS

FIG. 6 is a diagram illustrating an example of a traffic lane evaluation value determination table according to the exemplary embodiment of the present invention.

DESCRIPTION OF EMBODIMENT

Prior to describing an exemplary embodiment of the present invention, problems found in a conventional device will be briefly described herein. In the automatic driving assistance devices disclosed in PTL 1 and PTL 2, there is a case where automatic driving is switched to manual driving in a road condition that requires advanced driving skills, and in such a case, a large burden is imposed on a driver.

Hereinafter, an exemplary embodiment of the present invention will be described in detail with reference to the drawings.

In the exemplary embodiment, switching is taken as an example, the switching being made from full automatic driving in which vehicle control (steering, acceleration/deceleration braking, shift gears, direction indicators, and the like) is performed on a vehicle side, to manual driving, in which the vehicle control is entirely performed by the driver. Full automatic driving may be switched to semi-automatic driving in which only a part of the vehicle control is performed on the vehicle side, or the semi-automatic driving may be switched to the manual driving. As a premise, all or part of the vehicle is under automatic driving.

Exemplary Embodiment

Figure 1:
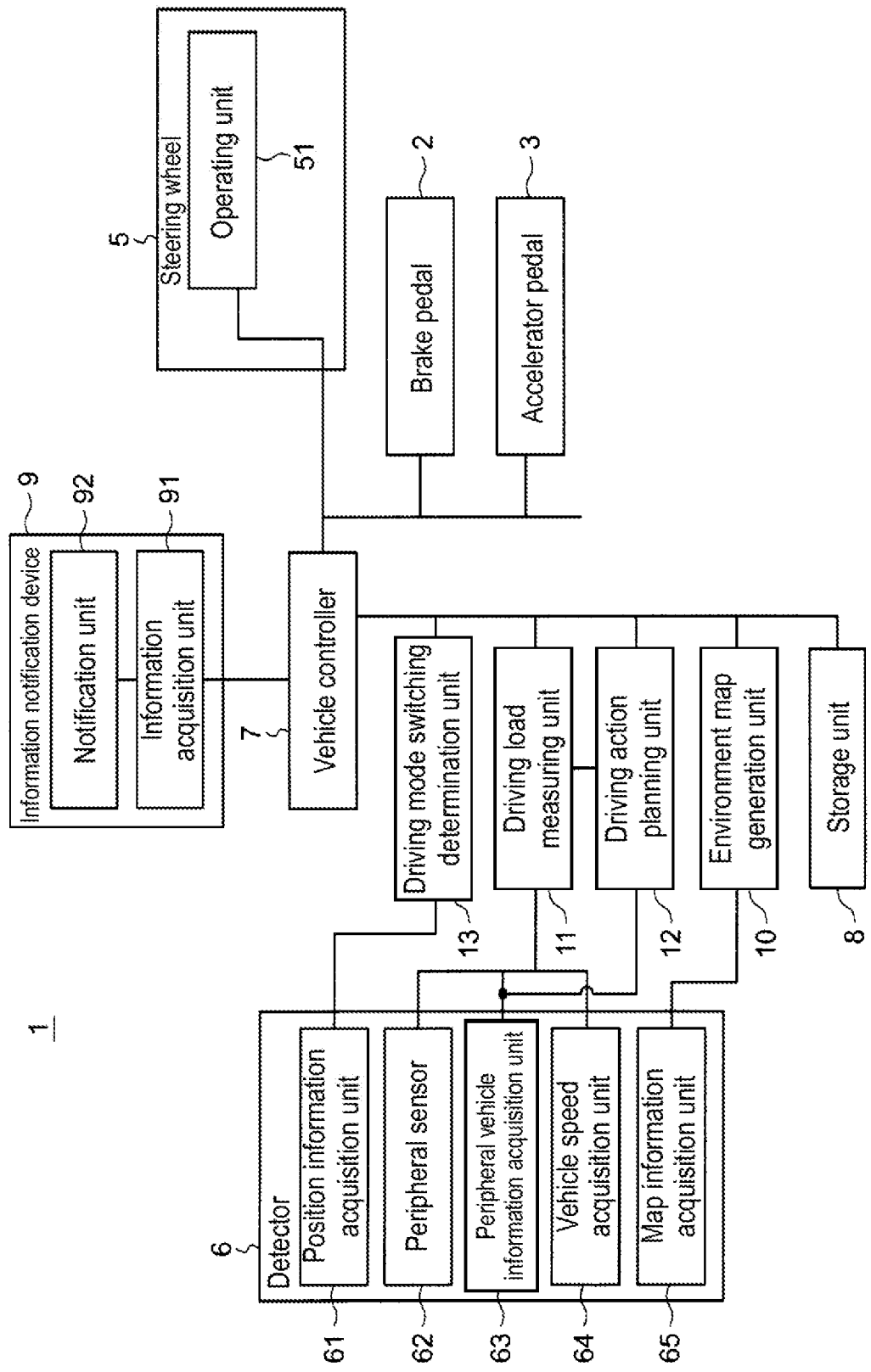
FIG. 1 is a block diagram illustrating a configuration of a main part of a vehicle including an automatic driving assistance device according to an exemplary embodiment of the present invention.

FIG. 1 is a block diagram illustrating a configuration of a main part of vehicle 1 including an automatic driving assistance device according to the exemplary embodiment of the present invention. Vehicle 1 is a vehicle that can automatically perform all or part of driving operations made by the driver.

Vehicle 1 includes brake pedal 2, accelerator pedal 3, steering wheel 5, detector 6, vehicle controller 7, storage unit 8, information notification device 9, environment map generation unit 10, driving load measuring unit 11, driving action planning unit 12, and driving mode switching determination unit 13.

Brake pedal 2 receives a brake operation performed by the driver to decelerate vehicle 1. Moreover, when vehicle 1 decelerates, a depression amount of brake pedal 2 may change in response to a degree of deceleration b control of vehicle controller 7.

Accelerator pedal 3 accelerates vehicle 1 while receiving an acceleration operation performed by the driver. Moreover, when vehicle 1 accelerates, a depression amount of accelerator pedal 3 may change in response to a degree of acceleration by control of vehicle controller 7.

Steering wheel 5 changes a traveling direction of vehicle 1 while receiving a steering wheel operation performed by the driver. Furthermore, when the traveling direction of vehicle 1 changes, a steering angle of steering wheel 5 may change in response to a change amount of the direction by control of vehicle controller 7. Steering wheel 5 includes operating unit 51.

Operating unit 51 is provided on a front face (face facing the driver) of steering wheel 5, and receives an input operation from the driver. Operating unit 51 is a device such as a button, a touch panel, and a grip sensor, for example. Operating unit 51 outputs information about the input operation, which is received from the driver, to vehicle controller 7.

Detector 6 detects a travel state of vehicle 1 and a situation around vehicle 1. Detector 6 includes position information acquisition unit 61, peripheral sensor 62, peripheral vehicle information acquisition unit 63, vehicle speed acquisition unit 64, and map information acquisition unit 65.

Position information acquisition unit 61 acquires position information of vehicle 1 as the information of the travel state by positioning of global positioning system (GPS) or the like, and outputs the acquired position information to driving mode switching determination unit 13.

Peripheral sensor 6 (corresponding to a peripheral detector) detects a situation around vehicle 1. For example, peripheral sensor 62 detects a position of a nearby vehicle present around vehicle 1 and a type of the nearby vehicle as to whether or not the nearby vehicle is a preceding vehicle from the position and lane position information of the nearby vehicle, detects an estimated collision time (TTC: time to collision) from a speed of the nearby vehicle and a speed of the host vehicle, and detects an obstacle present around vehicle 1. Then, peripheral sensor 62 outputs information about the detected situation around vehicle 1 to driving load measuring unit 11. For example, peripheral sensor 62 is configured by a millimeter wave radar, a laser radar, a camera, or a combination thereof.

Peripheral vehicle information acquisition unit 63 has a wireless communication device, wirelessly connects to a cloud server, acquires behavior data of the nearby vehicle around vehicle 1, which is stored in the cloud server, and outputs acquired behavior data of the nearby vehicle to driving load measuring unit 11 and driving action planning unit 12.

Vehicle speed acquisition unit 64 acquires speed information of vehicle 1 and the like from a speed sensor or the like (not shown) as the information about the travel state, and outputs the acquired information about the travel state to driving load measuring unit 11.

Map information acquisition unit 65 acquires map information around vehicle 1, such as a road on which vehicle 1 travels, a merging point with the nearby vehicle on the road, a lane on which vehicle 1 is currently traveling, and a position of an intersection, and outputs the acquired map information to environment map generation unit 10.

Storage unit 8 is a storage device such as a ROM (Read Only Memory), a RAM (Random Access Memory), a hard disk device, an SSD (Solid State Drive), or the like, and stores an environment map generated by environment map generation unit 10.

Vehicle controller 7 can be implemented as a part of an LSI (Large Scale Integrated) circuit or an ECU (Electronic Control Unit) that controls vehicle 1, for example. Vehicle controller 7 controls brake pedal 2, accelerator pedal 3, and steering wheel 5 based on information from storage unit 8, environment map generation unit 10, driving action planning unit 12, and driving mode switching determination unit 13, thereby controlling vehicle 1. Note that targets to be controlled by vehicle controller 7 are not limited to those described above.

In a case where a determination result that the automatic driving is to be switched to the manual driving is acquired from driving mode switching determination unit 13, vehicle controller 7 causes notification unit 92 of information notification device 9 to issue a notice that the switching is to be made to the manual driving. Moreover, in a case where information about a switching section where the automatic driving is switched to the manual driving is acquired from environment map generation unit 10, vehicle controller 7 causes notification unit 92 of information notification device 9 to provide notification regarding the switching section. Note that driving mode switching determination unit 13 and vehicle controller 7 function as a driving switching unit.

Information notification device 9 acquires various types of information regarding the traveling of vehicle 1 from vehicle controller 7, and provides notification regarding the acquired information. Information notification device 9 includes information acquisition unit 91 and notification unit 92.

Information acquisition unit 91 acquires various types of information regarding the traveling of vehicle 1 from vehicle controller 7. For example, in case where it is determined that vehicle controller 7 may update behavior of vehicle 1, information acquisition unit 91 acquires information about first behavior and information about second behavior from vehicle controller 7.

Notification unit 92 notifies the driver of the information regarding the traveling of vehicle 1. For example, notification unit 92 may be a display unit that displays information, may be a speaker that converts information into voice and notifies the driver of the voice, or may be a vibrator provided at a position (for example, a driver's seat, steering wheel 5, and the like) where the driver can sense vibrations thereof. In addition, notification unit 92 may be a combination of these elements.

In the following description, notification unit 92 is described as a display device.

In this case, for example, notification unit 92 is a head up display (HUD) a liquid crystal display (LCD), a head-mounted display or a helmet-mounted display (HMD), smart glasses, and other exclusive displays. HUD be a windshield of vehicle 1, or a glass surface or a p stir surface (for example, combiner) separately provided, for example. Further, the windshield may be a front windscreen, or a side windscreen or rear windscreen of vehicle 1, for example.

In addition, the HUD may be a transmission type display attached onto the surface or inside of the windshield. Herein, the transmission type display is a transmission type organic electroluminescence (EL) display or a transparent display using glass that emits light when being irradiated with light having a specific wavelength. The driver can visually recognize display on the transmission display while viewing a background. As described above, notification unit 92 may be a display medium that transmits light. In any case, an image is displayed on notification unit 92.

For example, notification unit 92 displays an environment map generated by environment map generation unit 10, which will be described later, and displays the switching section or a switching start point on the displayed environment map. Moreover, notification unit 92 may display a graph, in which a vertical axis represents a driving load measured by driving load measuring unit 11 to be described later, and a horizontal axis represents a distance, and then may display the switching section or the switching start point on the displayed graph.

For a travel section of vehicle 1, environment map generation, unit 10 (corresponding to a switching section determination unit) estimates a driving load (hereinafter, referred to as "environment-induced load") imposed on the driver due to a road shape such as a curve and a gradient, a road structure such as a road width, junction, and branch, and the like based on map information output from map information acquisition unit 65. Environment map generation unit 10 generates an environment map indicating the environment-induced load. Then, environment map generation unit 10 determines a section, in which the environment-induced load is equal to or less than a predetermined threshold, as the switching section in which the automatic driving is switchable to the manual driving, and provides notification regarding the determined switching section to vehicle controller 7 and driving mode switching determination unit 13.

Figure 2:
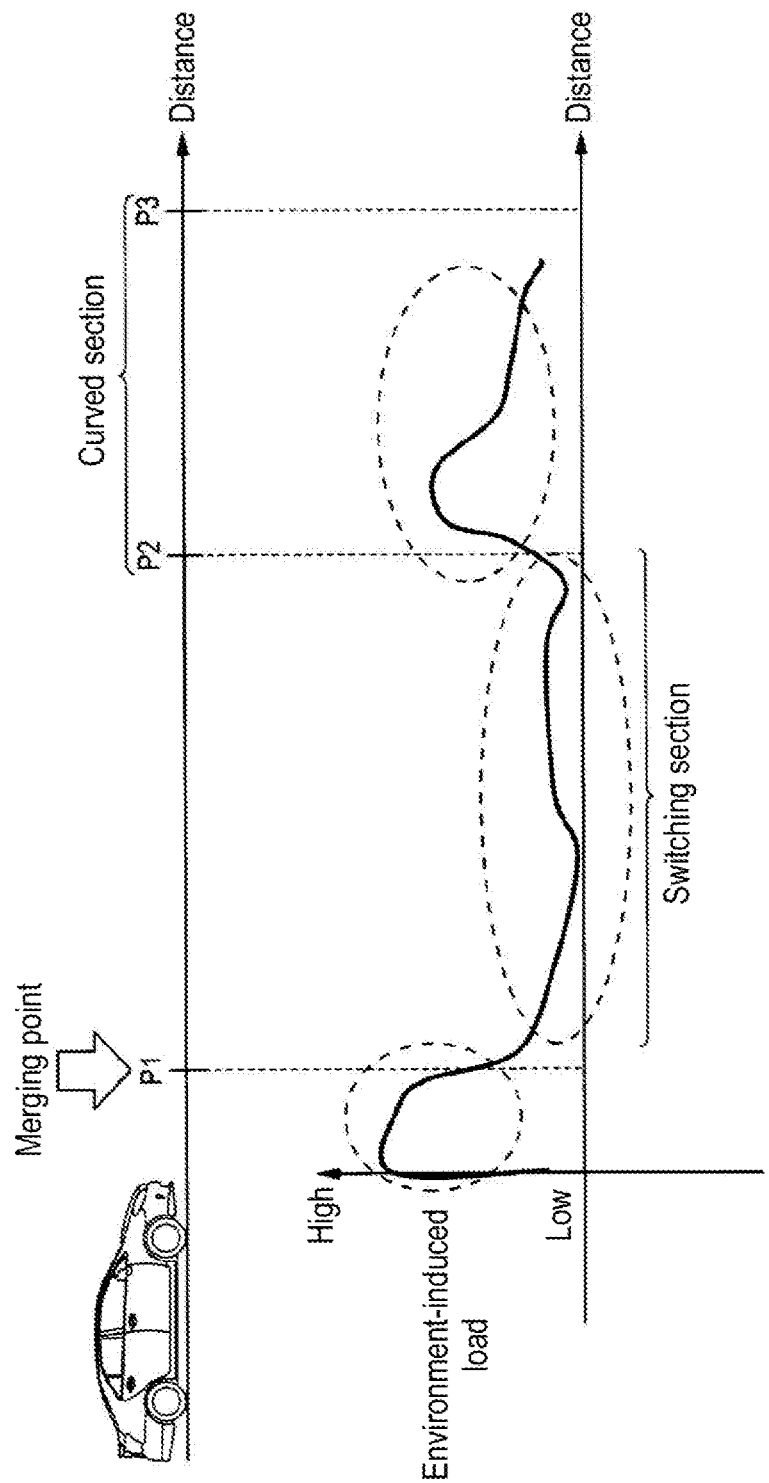
FIG. 2 is a diagram illustrating an example of an environment map according to the exemplary embodiment of the present invention.

FIG. 2 illustrates an example of the environment map. In FIG. 2, a horizontal axis represents a distance in the travel section of vehicle 1, and a vertical axis represents the environment-induced load. When point P1 is a merging point, the driving load becomes high before point P1, and after passing point P1, the environment-induced load decreases. Moreover, when a section from point P2 to point P3 is a curved section, for example, if a curvature of this curve is large, the environment-induced load increases, and if the curvature of the curve is small, the environment-induced load decreases. Further, as a change rate of the curvature of the curve is larger, the environment-induced load becomes higher. In FIG. 2, since the environment-induced load in the section from point P1 to point P2 is low (equal to or less than a predetermined threshold), and a distance of the section is a predetermined distance or more (a distance at which a sufficient time can be secured for switching the automatic driving to the manual driving), environment map generation unit 10 determines this section to be the switching section.

Driving load measuring unit 11 measures the driving load based on the information about the situation around vehicle 1, which is output from peripheral sensor 62, and based on the information about the travel state of vehicle 1, which is output from vehicle speed acquisition unit 64, and outputs the measured driving load to driving action planning unit 12. A method for manufacturing the driving load will be described later.

Driving action planning unit 12 generates a driving action plan so that the driving load output from driving load measuring unit 11 is reduced, and outputs the generated driving action plan to vehicle controller 7. Vehicle controller 7 starts the received driving action plan. The driving action plan includes: (1) to increase an inter-vehicle distance between vehicle 1 and the preceding vehicle to a predetermined distance or more; (2) to increase an inter-vehicle distance between vehicle 1 and the nearby vehicle, which travels around vehicle 1 and has a vehicle speed or a traveling track exceeding a predetermined variation range, to the predetermined distance or more; (3) to realize these driving actions by acceleration or deceleration; (4) to keep a vehicle speed within a prescribed range; (5) to merge into a group of vehicles whose vehicle speed is lower than the speed of vehicle 1 and having stable vehicle speed; (6) to follow or approach the nearby vehicle that travels around vehicle 1 at a speed in which a variation range remains within a prescribed range; (7) to search for the nearby vehicle, in which a variation range of a vehicle speed remains within a prescribed range, based on travel data of nearby vehicles, which are stored in a cloud, server, and then follow or approach the searched vehicle; and the like. Note that, in case of (7), based on a distribution state of the nearby vehicles, driving action planning unit 12 may group the nearby vehicles into a plurality of groups, may acquire driving load when it is assumed that vehicle 1 is present near each of the groups, and may select a group with a lowest driving load. Note that the inter-vehicle distance is not limited to the distance between vehicle 1 and the preceding vehicle or a distance between vehicle 1 and a following vehicle, but indicates a distance between vehicle 1 and the nearby vehicle that travels around vehicle 1.

Driving mode switching determination unit 13 detects whether or not vehicle 1 has entered the switching section based on the position information output from position information acquisition unit 61 and the switching section provided from environment map generation unit 10. In the case where detection is made that vehicle 1 has entered the switching section, driving mode switching determination unit 13 determines timing, at which the driving load output from driving load measuring unit 11 satisfies a predetermined condition, as timing at which the automatic driving is to be switched to the manual driving. Driving mode switching determination unit 13 instructs vehicle controller 7 to switch the automatic driving to the manual driving at the switching timing thus determined. Here, the predetermined condition includes: a condition that automatic driving that is based on the driving action plan generated by driving action planning unit 12 is ended, and the driving load becomes equal to or less than the predetermined threshold or the driving load becomes a minimum value. That is, the predetermined condition is that the driving load turns from a decreasing trend to an increasing trend, and so on. In this case, for example, driving mode switching determination unit 13 instructs vehicle controller 7 to switch the steering wheel operation to the manual driving preferentially among a plurality of operations, and to sequentially switch other operations to the manual driving.

Figure 3:
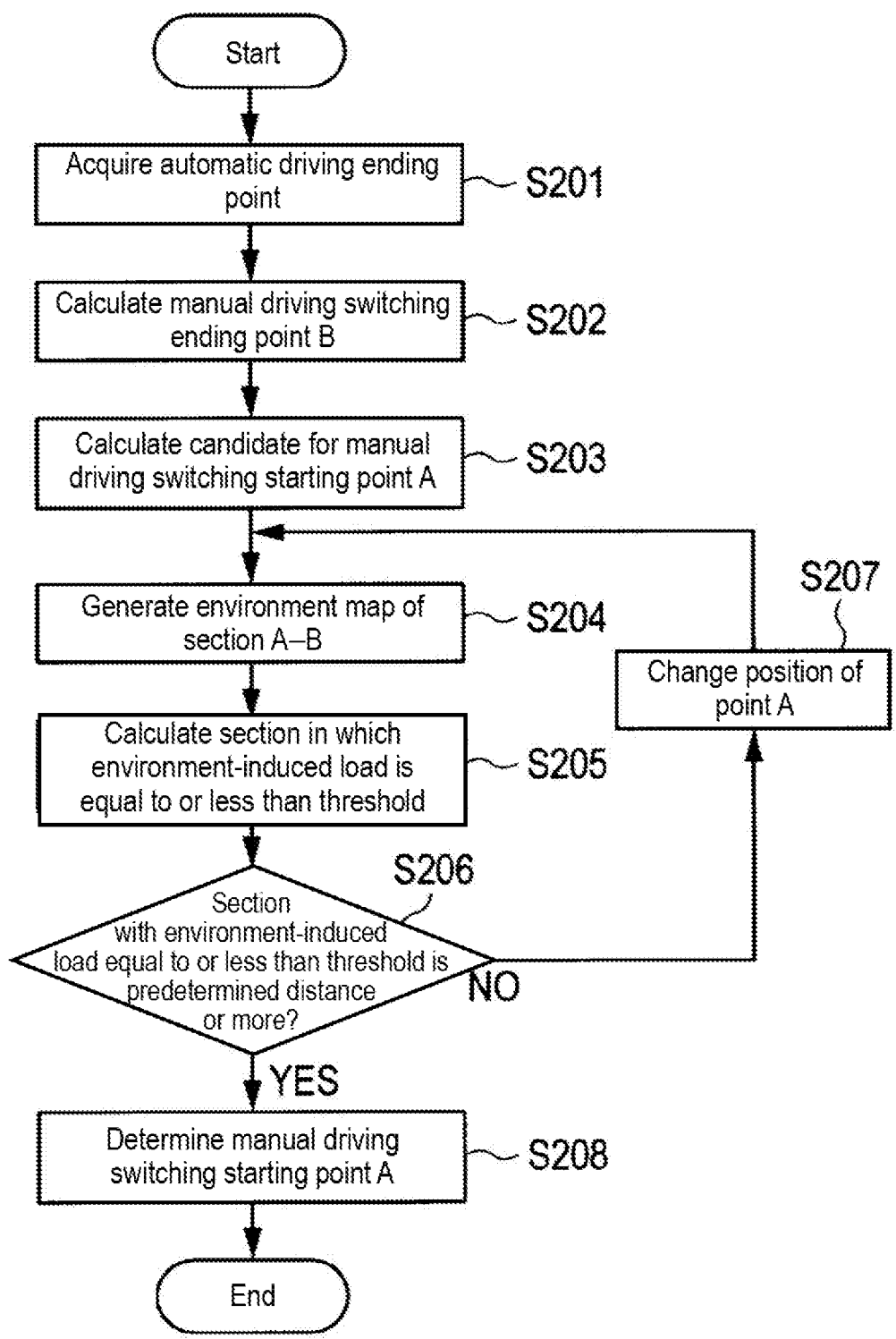
FIG. 3 is a flowchart illustrating a procedure of switching section determination processing in an environment map generation unit according to the exemplary embodiment of the present invention.

Next, the switching section determination processing in environment map generation unit 10 mentioned above will be described with reference to FIG. 3. FIG. 3 is a flowchart illustrating a procedure of the switching section determination processing in environment map generation unit 10.

In Step S201, environment map generation unit 10 acquires an automatic driving ending point based on the map information output from map information acquisition unit 65. As an ending point of the automatic driving, for example, an exit interchange of a toll road, through which vehicle 1 passes while heading toward a destination, a point preset by the driver, and the like are conceivable.

In Step S202, environment map generation unit 10 calculates manual driving switching ending point B located before the automatic driving ending point by a predetermined distance.

In Step S203, environment map generation unit 10 calculates a candidate for manual driving switching starting point A, and in Step S204, environment map generation unit 10 generates an environment map in section A-B. For example, as the candidate for manual driving switching starting point A, a point located before manual driving switching ending point B by the predetermined distance is calculated.

In Step S205, environment map generation unit 10 calculates a section in which an environment-induced load in the generated environment map is equal to or less than the predetermined threshold, and in Step S206, environment map generation unit 10 determines whether or not the distance of the calculated section is a predetermined distance or more. When the distance of the calculated section is less than a predetermined distance (NO), the processing proceeds to Step S207, and when the distance of the calculated section is a predetermined distance or more (YES), the processing proceeds to Step S208.

In Step S207, environment map generation unit 10 changes current manual driving switching starting point A to a position located a predetermined distance before, and returns to Step S204.

In Step S208, environment map generation unit 10 determines manual driving switching starting point A, and ends the switching section determination processing.

Figure 4:
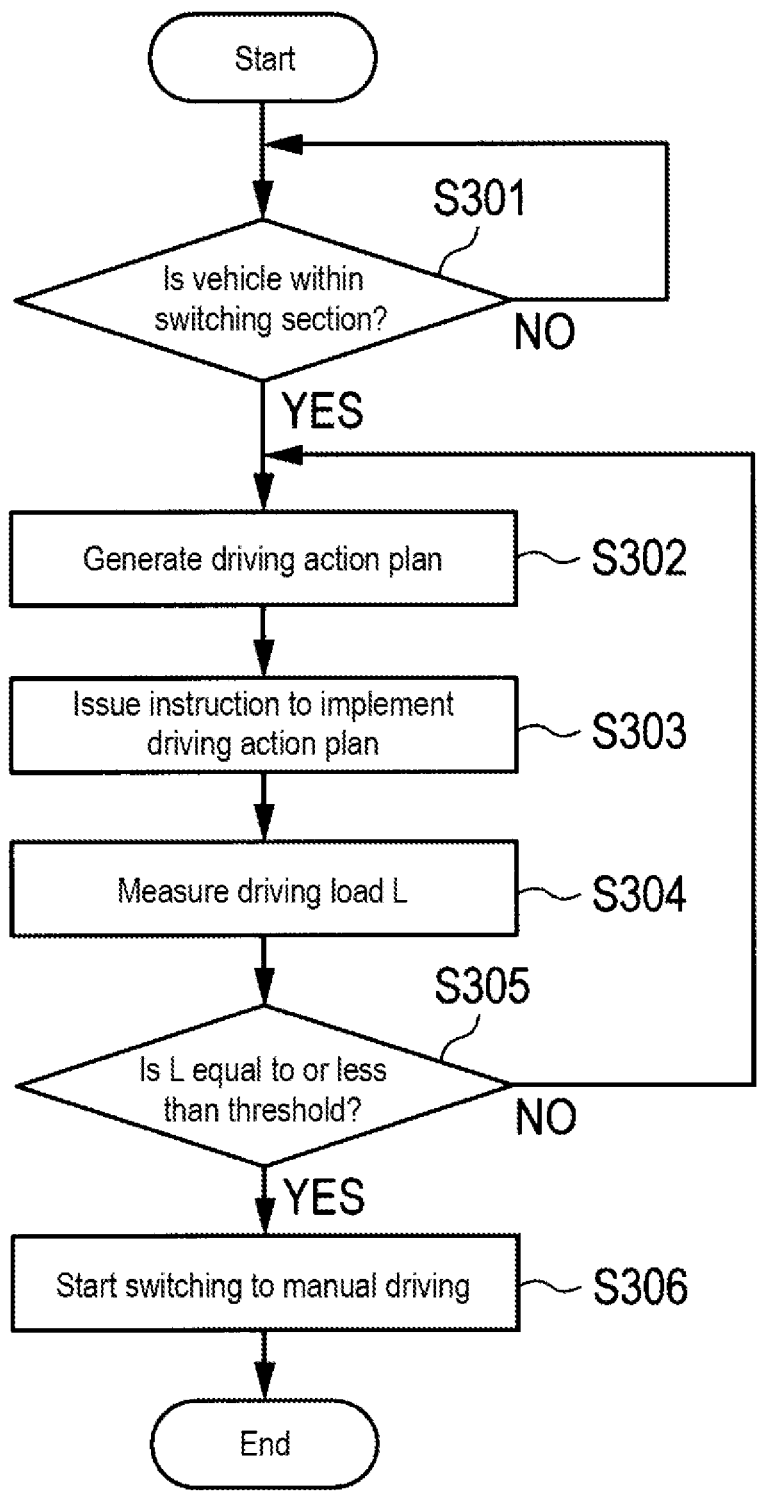
FIG. 4 is a flowchart illustrating a processing procedure for switching automatic driving to manual driving according to the exemplary embodiment of the present invention.

Next, a processing procedure for switching the automatic driving to the manual driving will be described with reference to FIG. 4. FIG. 4 is a flowchart illustrating a processing procedure for switching the automatic driving to the manual driving.

In Step S301, based on the position information of vehicle 1, which is acquired from position information acquisition unit 61, and the switching section acquired from environment map generation unit 10, driving mode switching determination unit 13 determines whether or not vehicle 1 has entered the switching section. When vehicle 1 has entered the switching section (YES), the processing proceeds to Step S302, and when vehicle 1 has not entered the switching section (NO), the process returns to Step S301.

In Step S302, driving action planning unit 12 generates the driving action plan, and in Step S303, driving action planning unit 12 instructs vehicle controller 7 to implement the driving action plan. In this way, vehicle controller 7 starts to implement the driving action plan so as to reduce the driving load.

In Step S304, driving load measuring unit 11 measures driving load L, and in Step S305, driving mode switching determination unit 13 determines whether or not driving load L is equal to or less than the predetermined threshold. When driving load L is equal to or less than the threshold (YES), the processing proceeds to Step S306, and when driving load L is larger than the threshold (NO), the processing returns to Step S302.

Note that, when it is anticipated that the driving action plan in which the driving load becomes equal to or less than the predetermined threshold can be reliably implemented in the above-described processing procedure for switching the automatic driving to the manual driving, it is not always necessary to execute processes of Step S304 and Step S305. Therefore, these processes may be omitted.

Figure 5:
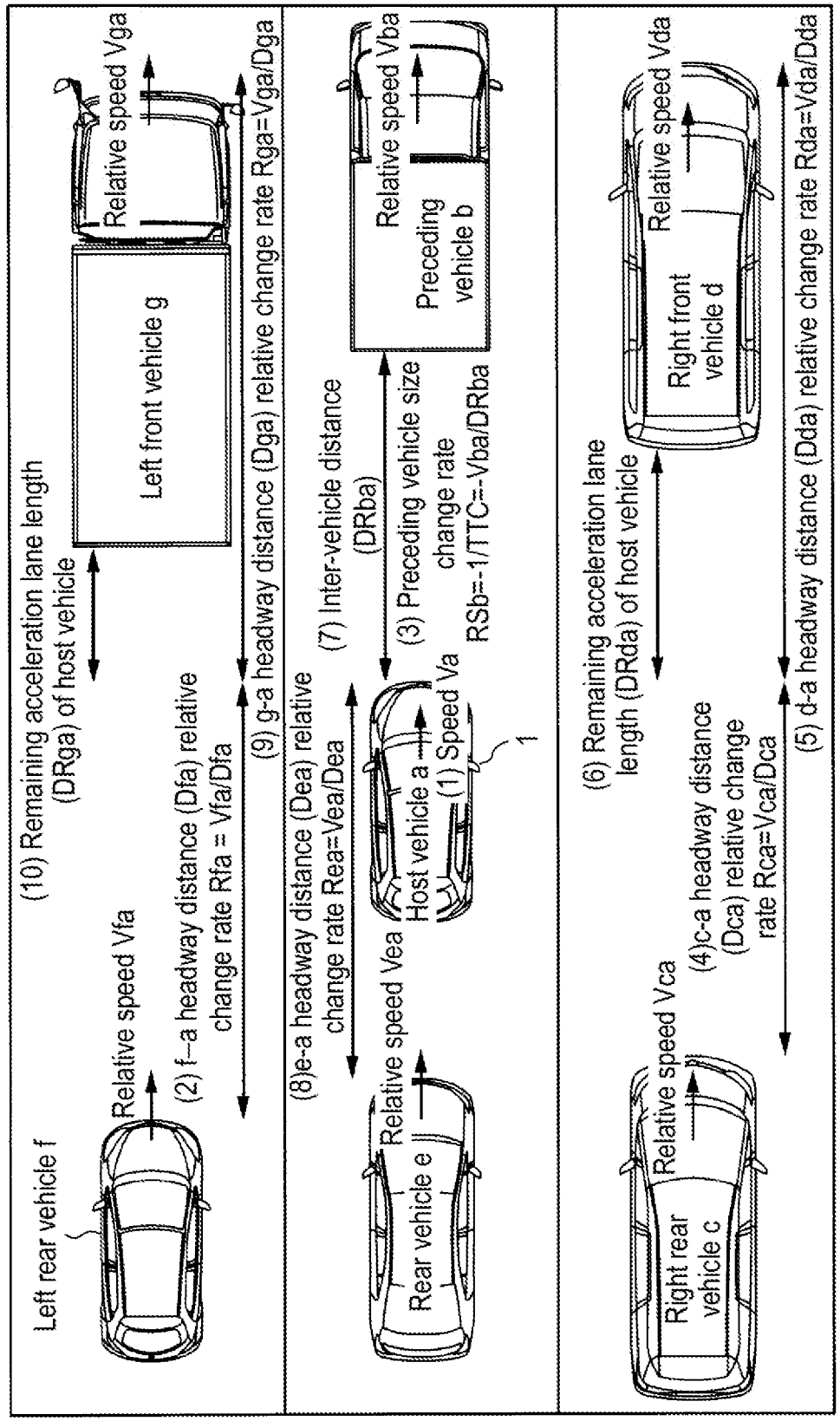
FIG. 5 is a diagram illustrating relationships between a traveling vehicle according to the exemplary embodiment of the present invention and nearby vehicles traveling around the vehicle.

Next, a method for calculating driving load L in driving load measuring unit 11 will be described with reference to FIG. 5. FIG. 5 is a diagram illustrating relationships between traveling vehicle 1 and nearby vehicles traveling around vehicle 1. FIG. 5 represents vehicle 1 as host vehicle a, and illustrates a state where host vehicle a is traveling on a center lane of three lanes. A vehicle that is traveling immediately in front of host vehicle a on a same lane as host vehicle a is represented as preceding vehicle b and a vehicle that is traveling immediately on the rear of host vehicle a can the same lane, is represented as rear vehicle e. Moreover, a vehicle that is traveling in front of host vehicle a on a right lane of host vehicle a is represented as right front vehicle d, and a vehicle that is traveling on the rear of host vehicle a on the right lane is represented as right rear vehicle c. Furthermore, a vehicle that is traveling in front of host vehicle a on a left lane of host vehicle a is represented as left front vehicle g, and a vehicle that is traveling on the rear of host vehicle a on the left lane is represented as left rear vehicle f. Note that, a position used for determining whether the surrounding vehicles is present in front of host vehicle a or on the rear of host vehicle a, a foremost portion of host vehicle a is taken as a reference.

Driving load L is calculated, for example, by obtaining following 13 parameters (1) to (13) and weighting the obtained parameters (1) to (13).

(1) Degree of speed of host vehicle: host vehicle speed Va (2) Degree of approach of left rear vehicle: headway distance relative change rate Rfa=left rear vehicle relative speed Vfa/headway distance Dfa with left rear vehicle (3) Presence and degree of approach of preceding vehicle: preceding vehicle size change rate RSb=1/TTC=−(preceding vehicle relative speed Vba)/inter-vehicle distance DRba with preceding vehicle (where TTC stands for Time To Collision)

(4) Degree of approach of right rear vehicle: headway distance relative change rate Rca=right rear vehicle relative speed Vca/headway distance Dca with right rear vehicle (5) Degree of approach of right front vehicle: headway distance relative change rate Rda=right front vehicle relative speed Vda/headway distance Dda with right front vehicle (6) Right lane change possibility: remaining acceleration lane length DRda of host vehicle on right lane (7) Right lane change benefit: inter-vehicle distance DRba with preceding vehicle (8) Presence and degree of approach of rear vehicle: headway distance relative change rate Rea=rear vehicle relative speed Vea/headway distance Dea with rear vehicle (9) Degree of approach of left front vehicle: headway distance relative change rate Rga=left front vehicle relative speed Vga/headway distance Dga with left front vehicle

(10) Left lane change possibility: remaining acceleration lane length DRga of host vehicle on left lane

(11) Traffic lane evaluation value: Lin (see FIG. 6)

As shown in FIG. 6, when the number of lanes is one, Lin is set to Lin=3 for the left lane, when the number of lanes is two, Lin is set to Lin=2 for the left lane, and is set to Lin=5 for the right lane, and when the number of lanes is three or more, Lin is set to Lin=1 for the left lane, is set to Lin=2 for the center lane, and is set to Lin=10 for the right lane.

(12) Presence of emergency vehicle: Emg (0: none; 1: present)

(13) Environment-induced load: Env

That is, driving load L is calculated by L=Va×w1+Rfa×w2+RSb×w3+Rca×w4+Rda×w5+DRda×w6+DRba×w7+Rea×w8+Rga×w9+DRga×w10+Lin×w11+Emg×w12+Env×w13.

For example, weights w1 to w13 are set to w1=1, w2=10, w3=50, w4=10, w5=10, w6=1, w7=100, w8=5, w9=10, w10=1, w11=20, w12=100, and w13=50.

As described above, a the automatic driving assistance device according to the present exemplary embodiment, the section in which the environment-induced load becomes equal to or less than the predetermined threshold is determined as the switching section where the automatic driving is switched to the manual driving. When vehicle 1 enters the switching section, the driving action plan of vehicle 1 is generated so that the driving load is reduced. After the automatic driving that is based on the generated driving action plan is ended, the automatic driving is switched to the manual driving. In this way, the burden imposed on the driver can be reduced when the automatic driving is switched to the manual driving.

(Modification)

In the above-described exemplary embodiment the description has been made of the example where the steering wheel operation is preferentially switched among the plurality of operations when the automatic driving is switched to the manual driving; however, the present invention is not limited to this. Hereinafter, a description will be made of conditions for switching each of the plurality of operations to the manual driving.

First, at the time of generating the environment map, environment map generation unit 10 evaluates environment-induced load Envstr, which affects the steering wheel operation, based on the curvature of the curve, the distances to the junction and the branch, the road width, and the like. Moreover, environment map generation unit 10 evaluates environment-induced load Envab, which affects the accelerator and brake operation, based on the gradient, the distances to the junction and the branch, and the like. Then, environment map generation unit 10 calculates environment-induced load Env by Env=Envstr+Envab.

Then, at the time of measuring the driving load, driving load measuring unit 11 measures driving load L for each of the operation, for example, in the following manner.

With regard to driving load Lh for the steering wheel operation, driving load measuring unit 11 calculates driving load L in consideration of all parameters other than (8) among parameters (1) to (13), adds Envstr to driving load L, and calculates driving load Lh. Then, when driving load Lh becomes equal to or less than the predetermined threshold, driving mode switching determination unit 13 switches the steering wheel operation to the manual driving.

Moreover, with regard to driving load La for the accelerator operation, driving load measuring unit 11 calculates driving load L in consideration of the above-described parameters (2) (3), (7) and (12), adds Envab to driving load L, and calculates driving load La. Then, when driving load La becomes equal to or less than the predetermined threshold, driving mode switching determination unit 13 switches the accelerator operation to the manual driving.

Moreover, with regard to driving load Lb for the brake operation, driving load measuring unit 11 calculates driving load L in consideration of all parameters other than (2), (4), and (11) among parameters (1) to (14), adds Envab to driving load L, and calculates driving load Lb. Then, when driving load Lb becomes equal to or less than the predetermined threshold, driving mode switching determination unit 13 switches the brake operation to the manual driving.

As described above, the automatic driving assistance device may switch the operations in order from an operation that satisfies the switching condition in each of the above-described operations.

INDUSTRIAL APPLICABILITY

The present invention is useful for reducing the burden imposed on the driver when the automatic driving is switched to the manual driving.

REFERENCE MARKS IN THE DRAWINGS

1: vehicle
2: brake pedal
3: accelerator pedal
5: steering wheel
51: operating unit
6: detector
61: position information acquisition unit
62: peripheral sensor 63: peripheral vehicle information acquisition unit
64: vehicle speed acquisition unit
65: map information acquisition unit
7: vehicle controller
8 storage unit
9: information notification device
91: information acquisition unit
92: notification unit
10: environment map generation unit
11: driving load measuring unit
12: driving action planning unit
13: driving mode switching determination unit

The invention claimed is:

1. An automatic driving assistance device in a vehicle that automatically performs at least a part of vehicle control including steering, braking, and acceleration and deceleration within a predetermined travel section, the automatic driving assistance device comprising:
 a switching section determination unit that determines, in the predetermined travel section, a section in which a first load that is based on a road shape or a road structure is equal to or less than a predetermined threshold as a switching section in which the at least a part of the vehicle control is switched from automatic driving to manual driving;
 a driving action planning unit that, when the vehicle enters the determined switching section, generates an automatic driving action plan so that a second load that is based on a travel situation of a nearby vehicle around the vehicle is reduced; and
 a driving switching unit that ends automatic driving that is based on the automatic driving action plan and switches the automatic driving to the manual driving.

2. The automatic driving assistance device according to claim 1, wherein when a first nearby vehicle travels in front of the vehicle, the driving action planning unit further generates the automatic driving action plan so that the vehicle and the first nearby vehicle are separated from each other by a predetermined distance or more.

3. The automatic driving assistance device according to claim 2, wherein the driving action planning unit further generates the automatic driving action plan so that the vehicle accelerates or decelerates to separate the vehicle from the first nearby vehicle or the second nearby vehicle by the predetermined distance or more.

4. The automatic driving assistance device according to claim 1, wherein when a vehicle speed or a traveling track of a second nearby vehicle traveling around the vehicle exceeds a predetermined variation range, the driving action planning unit further generates the automatic driving action plan so that the vehicle and the second nearby vehicle are separated from each other by a predetermined distance or more.

5. The automatic driving assistance device according to claim 4, wherein the driving action planning unit further generates the automatic driving action plan so that the vehicle accelerates or decelerates to separate the vehicle from the first nearby vehicle or the second nearby vehicle by the predetermined distance or more.

6. The automatic driving assistance device according to claim 1, wherein when at least one nearby vehicle traveling around the vehicle at a speed in which a variation range is within a prescribed range is present, the driving action planning unit further generates the automatic driving action plan so that the vehicle follows or approaches the at least one nearby vehicle.

7. The automatic driving assistance device according to claim 6, wherein the driving action planning unit searches for a vehicle in which the variation range of a vehicle speed falls within a prescribed range from among the at least one nearby vehicle based on travel data of the at least one nearby vehicle, the travel data being stored in a cloud server.

8. The automatic driving assistance device according to claim 7, wherein the at least one nearby vehicle includes a plurality of nearby vehicles.

9. The automatic driving assistance device according to claim 6, wherein the at least one nearby vehicle includes a plurality of nearby vehicles.

10. The automatic driving assistance device according to claim 1, wherein when the automatic driving is switched to the manual driving, the driving switching unit switches operations in the vehicle control in order from an operation with a low driving load.

11. The automatic driving assistance device according to claim 1, further comprising a notification unit that provides notification that the switching section is determined and that the automatic driving starts to be switched to the manual driving.

12. An automatic driving assistance method in a vehicle that automatically performs at least a part of vehicle control including steering, braking, and acceleration and deceleration within a predetermined travel section, the automatic driving assistance method comprising:
 a switching section determination step of determining, in the predetermined travel section, a section in which a first load that is based on a road shape or a road structure is equal to or less than a predetermined threshold as a switching section in which the at least a part of the vehicle control is switched from automatic driving to manual driving;
 a driving action planning step of, when the vehicle enters the determined switching section, generating an automatic driving action plan so that a second load that is based on a travel situation of a nearby vehicle around the vehicle is reduced; and
 a driving switching step of ending automatic driving that is based on the automatic driving action plan and switching the automatic driving to the manual driving.

* * * * *